United States Patent [19]
Beckmann

[11] Patent Number: 4,774,043
[45] Date of Patent: Sep. 27, 1988

[54] METHOD FOR PRODUCTION OF A HOLLOW SHAFT OF FIBER-REINFORCED PLASTIC

[75] Inventor: Hans-Dieter Beckmann, Gifhorn, Fed. Rep. of Germany

[73] Assignee: Volkswagen Aktiengesellschaft, Wolfsburg, Fed. Rep. of Germany

[21] Appl. No.: 848,704

[22] Filed: Apr. 4, 1986

[30] Foreign Application Priority Data

May 23, 1985 [DE] Fed. Rep. of Germany ....... 3518542

[51] Int. Cl.$^4$ ..................... B29C 55/22; B29B 15/10
[52] U.S. Cl. .................................. 264/134; 264/103; 264/136; 264/137; 264/292; 425/508; 425/393; 425/403
[58] Field of Search ............... 264/134, 136, 258, 103, 264/137, 173, 292; 425/508, 403, 393, 113

[56] References Cited

U.S. PATENT DOCUMENTS

| 2,897,840 | 8/1959 | Roberts et al. | 264/258 |
| 2,995,781 | 8/1961 | Sipler | 264/137 |
| 3,045,281 | 7/1962 | Skobel | 425/113 |
| 3,183,135 | 5/1965 | Berquist | 264/173 |
| 3,284,849 | 11/1966 | Coleman et al. | 425/393 |
| 3,966,864 | 6/1976 | Stenzenberger | 264/136 |
| 4,126,659 | 11/1978 | Blad | 264/137 |
| 4,364,894 | 12/1982 | Mayumi et al. | 264/137 |
| 4,512,836 | 4/1985 | Tucci | 264/137 |

*Primary Examiner*—Jeffery Thurlow
*Attorney, Agent, or Firm*—Brumbaugh, Graves, Donohue & Raymond

[57] ABSTRACT

In order to achieve defined fiber orientation angles in the fiber-reinforced plastic material of a hollow shaft, consisting of such material, the hollow shaft having regions of different diameters, a braided fiber tube constituting the starting material is pulled over a core, is impregnated with settable plastic, and is hardened.

6 Claims, 1 Drawing Sheet

U.S. Patent  Sep. 27, 1988  4,774,043
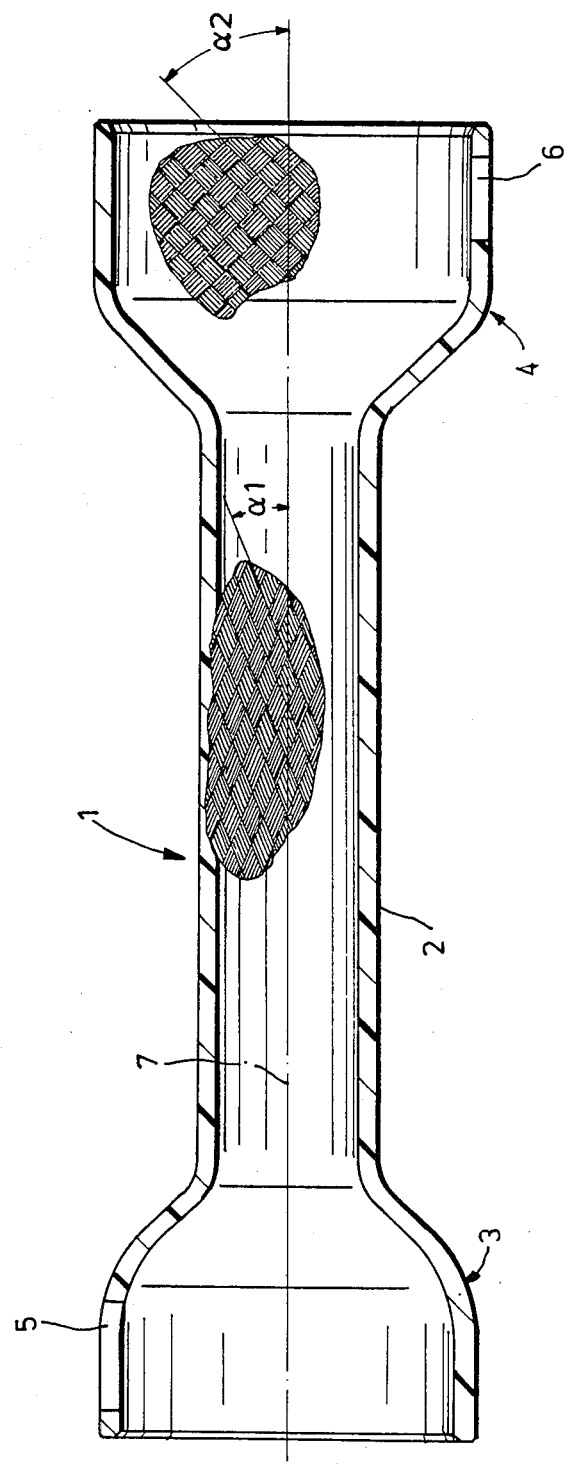

METHOD FOR PRODUCTION OF A HOLLOW SHAFT OF FIBER-REINFORCED PLASTIC

BACKGROUND OF THE INVENTION

The invention concerns a method for producing, with the use of a core, a hollow shaft of fiber-reinforced plastic having regions of different diameters. By preference, the production of a drive shaft or a universal shaft of an automobile is thereby contemplated.

In accordance with known methods of this kind, the hollow shaft is produced by winding of fibrous material over a mandrel or core with a fiber orientation angle which is determined according to resistance and rigidity requirements. However, a favorable fiber angle over the entire length of the hollow shaft can then be achieved only if the diameter of the hollow shaft is constant. If contrary thereto, the hollow shaft has regions with greatly differing diameters, e.g., if at its ends it has regions for accommodation of pivots with diameters which are considerably larger than the diameter in the middle region of the hollow shaft, the known winding methods provide relatively small winding angles in the regions of the large diameters. Since, however, in the end regions, there occurs the introduction of force, e.g., by means of pivot pins and towards such end, an angle of 45° is optimal, whereas the angles which are favorable to the tube region have a smaller diameter extending between the end regions ranging in size from 20° to 40°, it is not possible by means of the known winding system to optimize the fiber orientation in the hollow shaft.

SUMMARY OF THE INVENTION

It is the purpose of the invention to provide a method for producing a hollow shaft of fiber-reinforced plastic with regions of different diameter while preserving the advantages (low weight, sound insulation) of fiber-reinforced plastic. It is a further object to provide a method which, with a view to desirable resistance and rigidity properties, and in spite of its simplicity, permits obtaining a favorable gradient of the angle between the fibers, on the one hand, and parallels to the axis of the hollow shaft, on the other hand.

Pursuant to these objects, and others which will become apparent hereafter, one aspect of the invention resides in at least one braided fiber tube mounted over the core which is impregnated with a settable plastic before or after the mounting, and is set in the mounted state.

Deviating from the state of the art constituted by the winding method, the method in accordance with the invention thus makes use of a starting material, as it were, in the form of a braided fiber tube which has the property of possessing, when stretched, relatively small, but when upset (due to the diameter increase), relatively large, orientation angles of the defined kind.

However, the favorable fiber alignment need not be achieved at the cost of disadvantages, such as a limitation to defined wall thicknesses of the hollow shaft. Rather, it becomes possible to provide several braided fiber tubes or several superposed layers of one fiber tube through turning over thereof in the region of the ends of the hollow shaft, and to harden all of these jointly. Likewise, with regard to the time of impregnation of the fiber tube with settable plastic, there is freedom of choice. The fiber tube may be impregnated either before or after it is pulled over the core.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE illustrates, in partial longitudinal section, a product of the inventive method, namely, a drive shaft for an automobile.

DETAILED DESCRIPTION OF THE PREFERRED EMBODIMENTS

In the following, the method according to the invention is explained for a product of said method, namely, a drive shaft of an automobile whose ends are rendered as components of joints.

The hollow shaft -1- has a middle region -2- with a relatively smaller diameter, and end regions -3- and -4- with a relatively larger diameter. The end regions serve as components of joints whose pivots project into clearances -5- and -6- of the hollow shaft -1-. The material used for the hollow shaft -1- is, e.g., glass- or carbon-fiber-reinforced plastic, namely, in form of a braided tube as is customary per se. The tube is mounted over a core, not shown in the figure but having the inner shape of the hollow shaft -1-, so that in the middle portion -2- of the hollow shaft -1- there is automatically produced a fiber orientation which is characterized by an angle -$\alpha 1$- ranging from 20° to 25° formed by the fibers and parallels to the hollow shaft axis -7-. In the end regions -3- and -4- of the hollow shaft, which have a considerably larger diameter, a corresponding angle -$\alpha 2$- of approximately 45° is created, which is optimal for the introduction of force by means of joint pins projecting into the clearances -5- and -6-. This different alignment of the fibers does not necessitate any additional measures for its production but results automatically when the braided fiber tube is pulled over the individual diameter regions.

The clearances -5- and -6- can be produced in a simple manner, without any mechanical finishing work, by way of various mandrels displaceable transverse to the axis -7- in the core.

Following the mounting and impregnation of the braided fiber tube, said tube is hardened on the core. Thereafter, the core, which towards such end may be composed of two partial cores contiguous in the center shaft region -2-, is pulled out.

While the invention has been illustrated and described as embodied in a Method for Production of a Hollow Shaft of Fiber-Reinforced Plastic, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims:

1. A method for producing a hollow fiber-reinforced plastic shaft having a center axis and regions having different diameters which are rotationally symmetric, the method comprising: providing a core having a center axis and a plurality of regions having different diameters which are rotationally symmetric; mounting over the core at least one braided fiber tube having an initial braiding angle such that the tube fibers form an angle of 20°–40° with respect to the center axis of the shaft in regions of the shaft having a smallest diameter; impregnating the at least one braided fiber tube with a settable plastic for setting the tube; and setting the plastic while the tube is hled in fixed position on the different diameter regions of the core to provide a molded shaft having regions with different diameters.

2. A method for producing a hollow fiber-reinforced plastic shaft having a center axis and regions having different diameters which are rotationally symmetric, the method comprising: providing a core having a center axis and a plurality of regions having different diameters which are rotationally symmetric; mounting over the core at least one braided fiber tube having an initial braiding angle such that the tube fibers thereof form an angle of approximately 45° with respect to the center axis of the shaft in regions of the shaft having a largest diameter; impregnating the at least one braided fiber tube with a settable plastic for setting the tube; and setting the plastic while the tube is held in fixed position on the different diameter regions of the core to provide a molded shaft having regions with different diameters.

3. A method as defined in claim 1 or 2, wherein said impregnating step includes impregnating the at least one braided fiber tube before mounting it over the core.

4. A method as defined in claim 1 or 2, wherein said impregnating step includes impregnating the at least one braided fiber tube after mounting it over the core.

5. A method as defined in claim 1, wherein said step of mounting at least one braided tube includes mounting a fiber tube having an initial braiding angle so that the fibers form an angle of approximately 45° with respect to the axis of the hollow shaft in regions of the shaft having a largest diameter.

6. A method as defined in claim 1 or 2, wherein said step of mounting a fiber tube includes mounting the fiber tube in a plurality of layers in different directions.

* * * * *